Patented Aug. 18, 1931

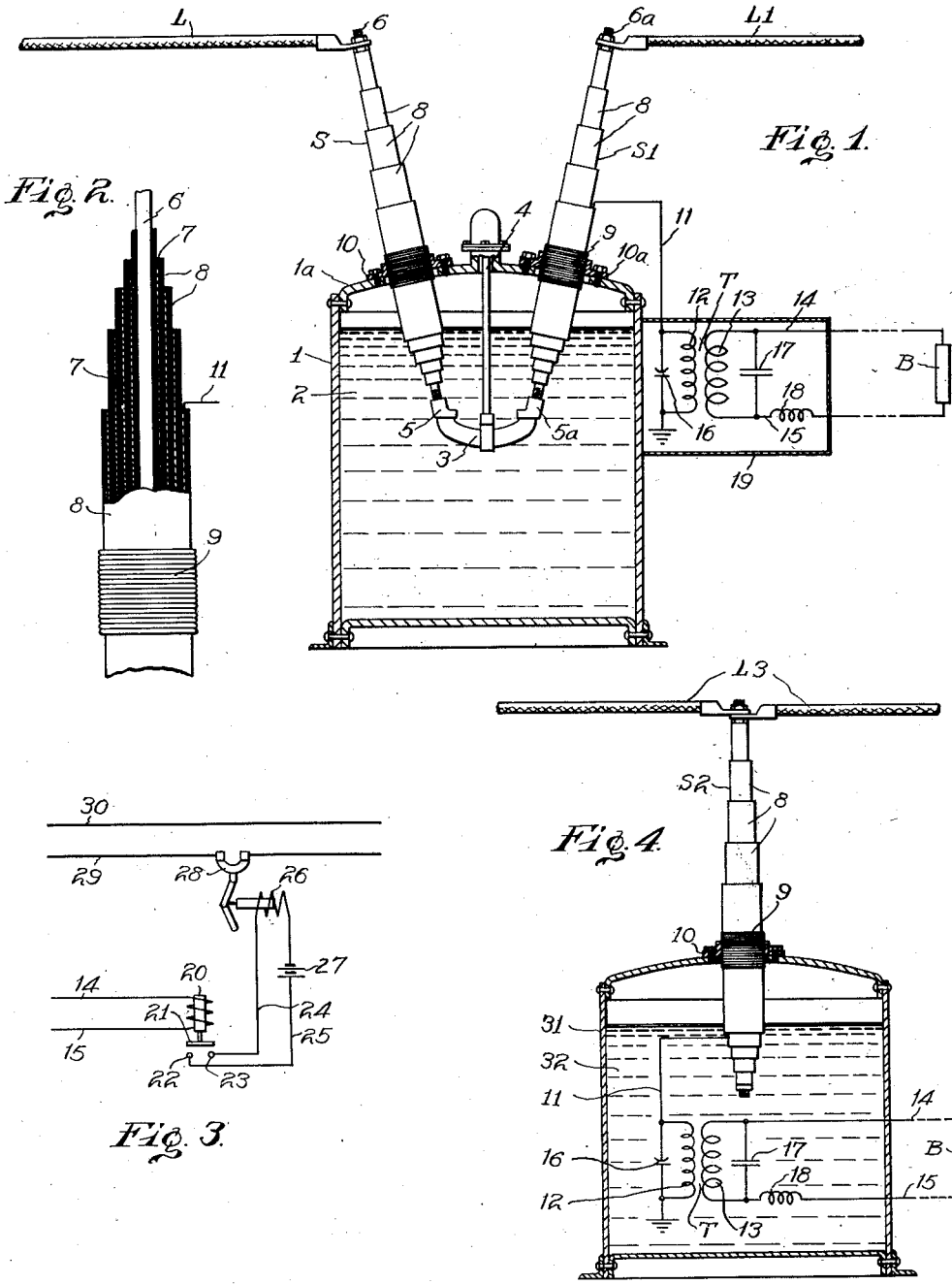

1,819,260

UNITED STATES PATENT OFFICE

JOHN F. PETERS, OF EDGEWOOD, PENNSYLVANIA, ASSIGNOR TO WESTINGHOUSE ELECTRIC & MANUFACTURING COMPANY, A CORPORATION OF PENNSYLVANIA

ELECTRICAL CONTROL SYSTEM

Application filed October 20, 1927. Serial No. 227,449.

My invention relates to an electrical control system and comprehends a method of and apparatus for deriving or obtaining an alternating potential, or other electrical quantity, from an electrical circuit, particularly a power circuit traversed by an alternating current of commercial frequency.

In accordance with my invention, an alternating potential of an electrical circuit is impressed on an oscillatory circuit and a suitable control is effected by the quantity thus produced in said oscillatory circuit.

Further in accordance with my invention, an electrical power circuit is capacitively coupled to a control circuit, which is usually resonant to the frequency of the current traversing said power circuit.

Further in accordance with my invention, an insulating structure or bushing is utilized to impress an alternating potential on a control circuit utilizable for any desired purpose.

My invention resides in the method, apparatus and system of the character hereinafter described and claimed.

For an understanding of my method and for an illustration of some of the forms my apparatus or system may take, reference is to be had to the accompanying drawings, in which Figure 1 is a diagrammatic view of an electrical control system constructed in accordance with my invention;

Fig. 2 is a vertical sectional view of a portion of a bushing or insulating structure;

Fig. 3 is a diagrammatic view showing an application of my invention, and

Fig. 4 is a diagrammatic view of a modified form of voltage control system.

Referring to the drawings, there is illustrated a tank or casing 1 within which is disposed a liquid medium 2 utilizable for insulating electrical apparatus of the character hereinafter described. In the example illustrated, the casing 1 is shown as containing a circuit-interrupting device or switch comprising a movable contact member 3 carried by an arm or member 4, said member 3 co-acting with fixed contact members 5 and 5a secured, respectively, to rigid rods or bars 6 and 6a of suitable conducting material, as copper, said rods 6 and 6a being connected to the respective line conductors L and L1 of an electrical circuit or system. As is well understood in the art, departure of the contact member 3 from the contact members 5 and 5a may be effected by suitable mechanism, not shown, responsive, for example, to some abnormal condition of the aforesaid electrical circuit.

The aforesaid conducting rods or members 6 and 6a extend through suitable perforations or passages in the cover 1a of the casing 1 and are comprised or included in insulating structures or bushings S and S1, each of said bushings comprising alternate layers of insulating and conducting material forming a plurality of condensers such, for example, as illustrated in Reynders U. S. Patent No. 952,467. Accordingly, and as shown, a layer 8 of suitable insulating material, as varnished paper, is disposed about each of the rods 6 and 6a. Disposed on each surface 8 of insulating material is a layer 7 of conductive material such, for example, as tin foil. Concentrically disposed with respect to each of the conductive layers 7 are any suitable number of alternate layers 8 and 7 of insulating and conducting material, respectively, as aforesaid. Wound upon each outer layer of insulating material is a conductive layer 9 formed, in the example shown, of convolutions of fine wire disposed in contacting relation or substantially so.

Each of the aforesaid bushings S and S1 is supported by the cover 1a of casing 1. To this end, members 10 and 10a are secured to the conductive layers 9 of the respective bushings S and S1, said members 10 and 10a being bolted, or otherwise suitably secured, to the aforesaid cover 1a.

In accordance with my invention, a control or operating circuit is capacitively coupled to the aforesaid electrical circuit comprising the line conductor L1, rod 6a, contact 5a, contact member 3, contact 5, rod 6 and conductor L. For this purpose, one of the aforesaid bushings may be and preferably is utilized, in which case, the aforesaid control or operating circuit comprises a conductor 11, one end of which is connected to the outermost layer of conducting material 7 and the other end of which is connected to the conductive layer 9. In the example illustrated, said other end of conductor 11 is grounded on the casing 1 and, since the layer 9 is conductively related to said casing 1, it follows that conductor 11 is connected as described.

Ordinarily, the aforesaid conductor 11 comprises the primary or high tension winding 12 of a voltage transformer T, the secondary or low tension winding 13 of which terminates in the conductors 14 and 15. Usually, there is connected across the primary winding 12 a spark gap 16, or the like, which breaks down upon occurrence of abnormally high voltage and immediately clears when normal conditions are restored.

Connected across the conductors 14 and 15 is a suitable capacity area 17, as a condenser, while included in one of said conductors 14 and 15 is an inductance element 18. The conductors 14 and 15 are of any suitable length and are connected to the respective terminals of a suitable burden B.

Preferably, the spark gap 16, transformer T, condenser 17 and inductance 18 are disposed within a metallic casing 19 secured to and carried by the wall structure of casing 1. Under such circumstances, the conductors 14 and 15 extend through a wall of casing 19.

The conductive layers 9 and 7, and the intervening insulating layer 8 constitute a condenser or capacity area with which the condenser 17 is effectively in parallel circuit relation. The magnitude of the inductance 18 is so chosen as to constitute with the two condensers, aforesaid, a tuned circuit resonant to the frequency of the current traversing the line conductors L and L1 to which this tuned circuit is capacitively coupled by the aforesaid condenser comprising the conductive layers 9, 7 and insulating layer 8. As a result, an alternating potential is impressed on the tuned circuit to produce a tuned circuit alternating potential, the resultant current traversing the burden B and passing serially through the two condensers aforesaid and the inductance 18. The voltage drops across the two condensers, on the one hand and the inductance on the other hand, balance out, and accordingly, the potential across the burden B is the aforesaid tuned circuit alternating potential, which is substantially proportional to and in phase with the line voltage to ground. This relationship is substantially independent of the magnitude and power factor of the burden B within the ordinary range of devices of that character.

It shall be understood, from the fundamental viewpoint, that my invention is not dependent upon the presence of the spark gap 16, condenser 17 and transformer T. Spark gap 16 constitutes a protective device merely, while the transformer T serves to reduce the voltage to magnitudes suitable for ordinary instruments or burdens. The condenser 17 is utilized because it is ordinarily impractical to provide an inductance which, coacting only with the condenser comprising the layers 7, 8 and 9, would produce a circuit tuned to the frequency of the current traversing the conductors L and L1.

The output or secondary winding 13 of transformer T may be connected to burdens of any suitable character such, for example, as have heretofore been utilized in connection with voltage transformers conductively connected to a high voltage circuit. Thus, the burden B may comprise an indicating instrument, such as a voltmeter or, and more often, a synchroscope, in which case, as is well understood in the art, a deflecting member or pointer is controlled to indicate the frequencies and voltage magnitudes of a plurality of electrical systems to be coupled together. Or, as indicated in Fig. 3, the burden B may constitute a relay 20, the energizing winding of which is included in the circuit of the conductors 14 and 15. The movable contact 21 of relay 20 coacts with a set of fixed contacts 22 and 23 connected, respectively, by conductors 24 and 25 with the energizing winding of a relay 26, a battery 27, or other source of current, being included in the circuit comprising the conductors 24 and 25. The armature of relay 26 is connected to the toggle or operating mechanism of a movable contact member 28 coacting with or bridging fixed contacts included in an electrical circuit comprising the conductors 29 and 30, from which the alternating potential is obtained for energizing the circuit comprising the conductors 14 and 15. Upon occurrence of some abnormal condition in the circuit comprising the conductors 29 and 30, the alternating potential in the circuit comprising the conductors 14 and 15 decreases abnormally, whereupon the relay 20 is deenergized and contact member 21 moves into engagement with the fixed contacts 22 and 23. As a result, relay 26 is energized to open the circuit comprising the conductors 29 and 30.

Referring to Fig. 4, there is illustrated an insulating structure or bushing S2 corresponding with the aforesaid bushings or structures S or S1. The bushing S2 of Fig. 4 is not associated with other electrical apparatus, as are the corresponding bushings of Fig. 1. It serves solely as a capacity area or condenser which is alternately charged and discharged by the alternating potential of an electrical circuit in which the conductor L3 is included. In an arrangement of the character illustrated in Fig. 4, the bushing S2 is supported and carried by the cover of a casing or container 31 and, by preference, the conductor 11 is connected to a conductive layer of said bushing internally rather than externally of said casing 31, while the apparatus of the resonant circuit comprising the spark gap 16, transformer T, condenser 17 and inductance 18 is disposed within an electrical insulating medium 32 occupying the interior of casing 31.

In lieu of the circuit breaker or switch diagrammatically illustrated in Fig. 1, it shall be understood that other types of electrical apparatus, for example, a transformer may be associated with one or more of the bushings S or S1.

A control circuit of the character herein described is usually, although not necessarily, utilized with transmission lines having a voltage of 110 kilovolts, or more.

It shall be understood that a plurality of the aforesaid bushings or insulating structures may be connected in parallel relation to obtain sufficient volt-ampere capacity in the control circuit, in the event that a single bushing or insulating structure is insufficient.

I claim as my invention:

1. In combination with a high-tension alternating current circuit, a high-tension bushing operatively associated with said circuit embodying means constituting a potentiometer having one terminal thereof connected to ground, and a tap from said potentiometer for deriving a voltage therefrom, a control circuit including a voltage transformer having the primary winding thereof connected between said tap and ground, an electro-responsive device connected for energization from the secondary of said transformer, and an inductive reactance means in said control circuit for correcting the phase-angle error of the voltage impressed on said electro-responsive device to render said voltage proportional to and substantially in phase with the voltage of said alternating current circuit.

2. In combination a high-tension alternating current circuit, a high-tension bushing operatively associated with said circuit embodying means constituting an electrostatic potentiometer having one terminal thereof connected to ground, and a tap from said potentiometer for deriving a voltage therefrom, a control circuit including a voltage transformer having the primary winding thereof connected between said tap and ground and an electroresponsive device connected for energization from the secondary of said transformer, said control circuit including inductive reactance of sufficient value to correct the phase-angle error of the voltage impressed on said electroresponsive device to render said voltage proportional to and substantially in phase with the voltage of said alternating current circuit.

3. In combination a high-tension alternating current circuit, a high-tension bushing operatively associated with said circuit embodying means constituting an electrostatic potentiometer having one terminal thereof connected to ground, and a tap from said potentiometer for deriving a voltage therefrom, a control circuit including a voltage transformer having the primary winding thereof connected between said tap and ground, an electroresponsive device connected for energization from the secondary of said transformer, and means in said control circuit including an inductive reactance device in series with a winding of said transformer for correcting the phase-angle error of the voltage impressed on said electroresponsive device to render said voltage proportional to and substantially in phase with the voltage of said alternating current circuit.

4. In combination with a high-tension alternating current circuit, a high-tension bushing operatively associated with said circuit embodying means constituting a potentiometer having one terminal thereof connected to ground, and a tap from said potentiometer for deriving a voltage therefrom, a control circuit including a voltage transformer having the primary winding thereof connected between said tap and ground, an electroresponsive device having inductive and resistive characteristics connected for energization from the secondary of said transformer, an inductive reactor in said control circuit connected in series with a winding of said transformer, a condenser connected in said control circuit in parallel with a winding of said transformer, and an overvoltage protective device connected across the primary winding of said transformer.

In testimony whereof, I have hereunto subscribed my name this 4th day of October, 1927.

JOHN F. PETERS.